United States Patent
Learned et al.

(10) Patent No.: US 10,686,513 B2
(45) Date of Patent: *Jun. 16, 2020

(54) METHOD AND APPARATUS FOR SMART ADAPTIVE DYNAMIC RANGE MULTIUSER DETECTION RADIO RECEIVER

(71) Applicant: Massachusetts Institute of Technology, Cambridge, MA (US)

(72) Inventors: Rachel E. Learned, Waltham, MA (US); Paul D. Fiore, Chelmsford, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/989,613

(22) Filed: May 25, 2018

(65) Prior Publication Data

US 2018/0367207 A1   Dec. 20, 2018

Related U.S. Application Data

(63) Continuation of application No. 14/648,049, filed as application No. PCT/US2013/047026 on Jun. 21, 2013, now Pat. No. 9,998,199.

(60) Provisional application No. 61/784,302, filed on Mar. 14, 2013.

(51) Int. Cl.
*H04B 7/08* (2006.01)
*H04K 3/00* (2006.01)
*H04W 24/08* (2009.01)

(52) U.S. Cl.
CPC ............. *H04B 7/086* (2013.01); *H04K 3/228* (2013.01); *H04W 24/08* (2013.01); *H04K 2203/32* (2013.01)

(58) Field of Classification Search
CPC combination set(s) only.
See application file for complete search history.

(56) References Cited

U.S. PATENT DOCUMENTS

| | | |
|---|---|---|
| 6,487,414 B1 | 11/2002 | Tanay et al. |
| 6,704,376 B2 | 3/2004 | Mills et al. |
| 6,947,505 B2 | 9/2005 | Learned |

(Continued)

FOREIGN PATENT DOCUMENTS

| WO | WO 2010/066289 A1 | 6/2010 | |
|---|---|---|---|
| WO | WO-2010066289 A1 * | 6/2010 | ........... H04B 7/0851 |

(Continued)

OTHER PUBLICATIONS

Notice of Allowance dated Jan. 23, 2019 for U.S. Appl. No. 15/317,750; 15 Pages.

(Continued)

*Primary Examiner* — Lakeram Jangbahadur
(74) *Attorney, Agent, or Firm* — Daly, Crowley, Mofford & Durkee, LLP

(57) ABSTRACT

A receiver includes multi-user detection (MUD) functionality and a cognitive engine. The receiver may also be coupled to multiple antennas and have analog beamforming capability. The cognitive engine is operative for selecting a beam or beams associated with the multiple antennas to enable successful demodulation by the MUD. The receiver has application in multiple access channels and in other communication scenarios.

7 Claims, 6 Drawing Sheets

(56) References Cited

U.S. PATENT DOCUMENTS

| | | |
|---|---|---|
| 7,031,266 B1 | 4/2006 | Patel et al. |
| 7,058,422 B2 | 6/2006 | Learned et al. |
| 7,085,575 B2 | 8/2006 | Fabien et al. |
| 7,092,452 B2 | 8/2006 | Taylor et al. |
| 7,126,890 B2 | 10/2006 | Learned et al. |
| 7,190,743 B2 | 3/2007 | Learned |
| 7,218,690 B2 | 5/2007 | Learned |
| 7,269,223 B2 | 9/2007 | Learned et al. |
| 7,558,238 B1 | 7/2009 | Sun et al. |
| 7,593,473 B2 | 9/2009 | Learned et al. |
| 7,593,492 B1 | 9/2009 | Lande |
| 7,724,851 B2 | 5/2010 | Learned et al. |
| 7,738,906 B2 | 6/2010 | Attar et al. |
| 7,787,553 B2 | 8/2010 | Prasad et al. |
| 8,218,450 B2 | 7/2012 | Aoyama et al. |
| 9,693,351 B2 | 6/2017 | Learned |
| 9,693,361 B2 | 6/2017 | Learned et al. |
| 9,699,665 B2 | 7/2017 | Leanred |
| 9,998,199 B2 | 6/2018 | Learned et al. |
| 10,091,798 B2 | 10/2018 | Learned et al. |
| 2001/0028675 A1* | 10/2001 | Bierly ............... H04B 1/708 375/143 |
| 2002/0002052 A1 | 1/2002 | McHenry |
| 2002/0122413 A1 | 9/2002 | Shoemake |
| 2003/0139196 A1 | 7/2003 | Medvedev et al. |
| 2004/0018843 A1 | 1/2004 | Cerwall et al. |
| 2004/0082363 A1 | 4/2004 | Hosein |
| 2004/0235472 A1 | 11/2004 | Fujishima et al. |
| 2005/0124347 A1 | 6/2005 | Hosein |
| 2005/0201280 A1 | 9/2005 | Lundby et al. |
| 2005/0282550 A1 | 12/2005 | Cho et al. |
| 2006/0193294 A1 | 8/2006 | Jorswieck et al. |
| 2007/0086379 A1 | 4/2007 | Takayanagi et al. |
| 2008/0089279 A1 | 4/2008 | Hu et al. |
| 2008/0198828 A1 | 8/2008 | Reznik et al. |
| 2008/0293353 A1* | 11/2008 | Mody ............... H04K 3/226 455/1 |
| 2009/0154534 A1 | 6/2009 | Hassan |
| 2009/0190566 A1 | 7/2009 | Kwon et al. |
| 2009/0258597 A1 | 10/2009 | Chen et al. |
| 2009/0291640 A1 | 11/2009 | Bhattad et al. |
| 2010/0124930 A1 | 5/2010 | Andrews et al. |
| 2010/0142465 A1 | 6/2010 | Medepalli et al. |
| 2010/0165956 A1 | 7/2010 | Razzell |
| 2010/0289688 A1 | 11/2010 | Sherman et al. |
| 2010/0304770 A1 | 12/2010 | Wietfeldt et al. |
| 2011/0002411 A1 | 1/2011 | Forenza et al. |
| 2011/0013570 A1* | 1/2011 | Sherman ............ H04B 7/18513 370/329 |
| 2011/0021153 A1* | 1/2011 | Safavi .................. H04B 7/0434 455/63.1 |
| 2011/0093540 A1 | 4/2011 | Eisenberg et al. |
| 2011/0176508 A1 | 7/2011 | Altintas et al. |
| 2011/0205929 A1 | 8/2011 | Quek et al. |
| 2011/0286351 A1 | 11/2011 | Reudink |
| 2012/0039183 A1 | 2/2012 | Barbieri et al. |
| 2012/0069941 A1* | 3/2012 | Herbig ................ H04B 7/0851 375/347 |
| 2012/0071102 A1 | 3/2012 | Palomar et al. |
| 2012/0108276 A1* | 5/2012 | Lang et al. ......... H04L 27/0006 455/501 |
| 2012/0208571 A1 | 8/2012 | Park et al. |
| 2013/0035108 A1 | 2/2013 | Joslyn et al. |
| 2013/0244681 A1 | 9/2013 | Ookubo et al. |
| 2014/0105136 A1 | 4/2014 | Tellado et al. |
| 2014/0126488 A1 | 5/2014 | Learned |
| 2014/0293867 A1 | 10/2014 | Horiuchi et al. |
| 2014/0314003 A1 | 10/2014 | Zhou et al. |
| 2014/0348004 A1 | 11/2014 | Ponnuswamy |
| 2015/0049721 A1 | 2/2015 | Wijting et al. |
| 2015/0282189 A1* | 10/2015 | Learned ............. H04L 27/0006 370/329 |
| 2017/0118762 A1 | 4/2017 | Learned |
| 2018/0367207 A1 | 12/2018 | Learned et al. |

FOREIGN PATENT DOCUMENTS

| | | | |
|---|---|---|---|
| WO | WO 2011/006116 A1 | 1/2011 | |
| WO | WO-2011006116 A1 * | 1/2011 | ........... H04B 7/0434 |
| WO | WO 2011/055319 A1 | 5/2011 | |
| WO | WO 2013/185150 A1 | 12/2013 | |
| WO | WO 2014/052992 A1 | 4/2014 | |
| WO | WO 2016/053406 A1 | 4/2016 | |
| WO | WO 2016/053406 A9 | 5/2016 | |
| WO | WO 2016/114844 A2 | 7/2016 | |

OTHER PUBLICATIONS

U.S. Appl. No. 14/437,350, filed Apr. 21, 2015, MacLeod.
U.S. Appl. No. 14/437,882, filed Apr. 23, 2015, Learned, et al.
U.S. Appl. No. 14/585,780, filed Dec. 30, 2014, Learned.
U.S. Appl. No. 14/867,687, filed Sep. 28, 2015, Learned.
U.S. Appl. No. 15/317,750, filed Dec. 9, 2016, Learned.
U.S. Appl. No. 15/618,848, filed Jun. 9, 2017, Learned, et al.
Ahmed, et al.; "Entropy Expressions and Their Estimators for Multivariate Distributions;" IEEE Transactions on Information Theory; vol. 35; No. 3; May 1989; pp. 688-692.
Bahl, et al.; "Optimal Decoding of Linear Codes for Minimizing Symbol Error Rate;" IEEE Transactions on Information Theory; Mar. 1974; pp. 284-287.
Learned; "Making Optimal Use of the Asymmetric Inference Channel;" IEEE; Signals, Systems and Computers (Asilomar); Nov. 6-9, 2011; pp. 1722-1727.
Learned; "Making Optimal Use of the Asymmetric Interference Channel;" Asilomar Conference on Signals, Systems, and Computing; Presentation; Nov. 8, 2011; 63 pages.
Neeser, et al.; "Proper Complex Random Processes with Applications to Information Theory;" IEEE Transactions on Information Theory; vol. 39; No. 4; Jul. 1993; pp. 1293-1302.
Pham; "Fast Algorithms for Mutual Information Based Independent Component Analysis;" IEEE Transactions on Signal Processing; vol. 52; No. 10; Oct. 2004; pp. 2690-2700.
Tufts; "Design Problems in Pulse Transmission;" Technical Report 368; Massachusetts Institute of Technology; Jul. 28, 1960; 52 pages.
Tufts; "Nyquist's Problem—The Joint Optimization of Transmitter and Receiver in Pulse Amplitude Modulation;" Proceedings of the IEEE: vol. 53; Issue 3; pp. 248-259.
Ungerboeck; "Channel Coding with Multilevel/Phase Signals;" IEEE Transactions on Information Theory; vol. IT-28; No. 1; Jan. 1982; pp. 55-67.
Verdu; "The Capacity Region of the Symbol-Asynchronous Gaussian Multiple-Access Chanel;" IEEE Transactions on Information Theory; vol. 35; No. 4; Jul. 1989; pp. 733-751.
International Preliminary Report on Patentability of the ISA for Appl. No. PCT/US2013/031900 dated May 21, 2015.
International Preliminary Report on Patentability of the ISA for Appl. No. PCT/US2013/068710 dated May 21, 2015.
International Search Report of the ISA for PCT/US2013/031900 dated Jan. 15, 2014.
International Search Report of the ISA for PCT/US2013/47026 dated Jun. 21, 2013.
International Search Report of the ISA for PCT/US2013/68710 dated Jan. 7, 2014.
Notice of Allowance dated Apr. 4, 2017 for U.S. Appl. No. 14/437,882; 11 Pages.
Notice of Allowance dated Jun. 8, 2015 corresponding to U.S. Appl. No. 13/998,566; 17 Pages.
Notice of Allowance dated Mar. 17, 2017 for U.S. Appl. No. 14/437,350; 10 Pages.
Office Action dated Feb. 4, 2015 for U.S. Appl. No. 13/998,566, filed Nov. 7, 2013.
Office Action dated Nov. 15, 2017 from U.S. Appl. No. 15/618,848; 18 Pages.
PCT International Preliminary Report dated Dec. 29, 2016 corresponding to International Application No. PCT/US2015/035963; 7 Pages.

(56) References Cited

OTHER PUBLICATIONS

PCT International Preliminary Report dated Sep. 24, 2015 corresponding to International Application No. PCT/US2013/047026; 11 Pages.
PCT International Preliminary Report on Patentability of the ISA dated May 18, 2017 from International App. No. PCT/US2015/058586; 6 Pages.
PCT International Search Report and Written Opinion dated Feb. 26, 2016 for PCT International Application No. PCT/US2015/035963; 11 Pages.
PCT International Search Report and Written Opinion dated Jul. 15, 2016 corresponding to International Application No. PCT/US2015/058586; 12 Pages.
Response to Office Action dated Feb. 4, 2015 corresponding to U.S. Appl. No. 13/998,566; Response filed on May 4, 2015; 8 Pages.
Response to Restriction Requirement dated Aug. 16, 2016 for U.S. Appl. No. 14/437,350; Response filed on Sep. 12, 2016; 1 Page.
Response to Restriction Requirement dated Nov. 9, 2016 corresponding to U.S. Appl. No. 14/437,882; Response filed on Nov. 29, 2016; 1 Page.
Response to U.S. Non-Final Office Action dated Jan. 5, 2017 for U.S. Appl. No. 14/437,882; Response filed on Jan. 31, 2017; 13 Pages.
Response to U.S. Office Action dated Sep. 29, 2016 corresponding to U.S. Appl. No. 14/437,350; Response filed on Dec. 19, 2016; 8 Pages.
Response to U.S. Office Action dated Sep. 9, 2016 corresponding to U.S. Appl. No. 14/585,780; Response filed Dec. 7, 2016; 6 Pages.
U.S. Notice of Allowance dated Mar. 22, 2017 corresponding to U.S. Appl. No. 14/585,780; 14 Pages.
U.S. Office Action dated Jan. 5, 2017 corresponding to U.S. Appl. No. 14/437,882; 11 Pages.
U.S. Office Action dated Sep. 29, 2016 corresponding to U.S. Appl. No. 14/437,350; 8 Pages.
U.S. Office Action dated Sep. 9, 2016 for U.S. Appl. No. 14/585,780; 27 Pages.
U.S. Restriction Requirement dated Aug. 16, 2016 corresponding to U.S. Appl. No. 14/437,350; 7 Pages.
U.S. Restriction Requirement dated Nov. 9, 2016 corresponding to U.S. Appl. No. 14/437,882; 7 Pages.
Written Opinion of the ISA for PCT/US2013/031900 dated Jan. 15, 2014.
Written Opinion of the ISA for PCT/US2013/47026 dated Jun. 21, 2013.
Written Opinion of the ISA for PCT/US2013/68710 dated Jan. 7, 2014.
U.S. Office Action (Quayle Action) dated Aug. 27, 2018 for U.S. Appl. No. 15/522,844; 21 pages.
Response to U.S. Office Action dated Aug. 27, 2018 for U.S. Appl. No. 15/522,844, filed Sep. 14, 2018; 5 pages.
Notice of Allowance dated Oct. 12, 2018 for U.S. Appl. No. 15/522,844; 11 pages.
Response to U.S. Office Action dated Nov. 15, 2017 for U.S. Appl. No. 15,618,848, filed Feb. 15, 2018; 7 pages.
U.S. Final Office Action dated May 7, 2018 for U.S. Appl. No. 15,618,848; 11 pages.
Response to U.S. Final Office Action dated May 7, 2018 for U.S. Appl. No. 15,618,848, filed Jul. 23, 2018; 8 pages.
Notice of Allowance dated Aug. 2, 2018 for U.S. Appl. No. 15/618,848; 9 pages.
U.S. Office Action dated Jul. 18, 2018 for U.S. Appl. No. 15/317,750; 32 pages.
Response to U.S. Office Action dated Jul. 18, 2018 for U.S. Appl. No. 15/317,750, filed Oct. 11, 2017; 8 pages.
U.S. Office Action dated Oct. 12, 2016 for U.S. Appl. No. 14/648,049; 33 pages.
Response to U.S. Office Action dated Oct. 12, 2016 for U.S. Appl. No. 14/648,049, filed Jan. 31, 2017; 13 pages.
U.S. Office Action dated Apr. 14, 2017 for U.S. Appl. No. 14/648,049; 35 pages.
Response to U.S. Office Action dated Apr. 14, 2017 for U.S. Appl. No. 14/648,049, filed Jul. 14, 2017; 17 pages.
Final Office Action dated Sep. 12, 2017 for U.S. Appl. No. 14/648,049; 43 pages.
Request for Continued Examination (RCE) and Response to Final Office Action dated Sep. 12, 2017 for U.S. Appl. No. 14/648,049, filed Feb. 12, 2018; 20 pages.
Notice of Allowance dated Mar. 27, 2018 for U.S. Appl. No. 14/648,049; 9 pages.

* cited by examiner

METHOD AND APPARATUS FOR SMART ADAPTIVE DYNAMIC RANGE MULTIUSER DETECTION RADIO RECEIVER

CROSS REFERENCE TO RELATED APPLICATIONS

This application is a continuation of U.S. application Ser. No. 14/648,049 filed May 28, 2015 and entitled "METHOD AND APPARATUS FOR SMART ADAPTIVE DYNAMIC RANGE MULTIUSER DETECTION RADIO RECEIVER" which is a U.S. National Stage application of PCT application PCT/US2013/047026 filed Jun. 21, 2013 which claims the benefit of U.S. Provisional Application No. 61/784,302 filed Mar. 14, 2013. All applications are hereby incorporated herein by reference in their entireties.

STATEMENT REGARDING FEDERALLY SPONSORED RESEARCH

This invention was made with government support under Contract No. FA8721-05-C-0002 awarded by the U.S. Air Force. The government has certain rights in the invention.

FIELD

Subject matter described herein relates generally to wireless communication and more particularly to cognitive radio systems and techniques for achieving ad hoc wireless communications in the presence of other user interference (sometimes referred to herein as "interference multiple access wireless communications").

BACKGROUND

As is known in the art, multiuser detection algorithms are increasingly being considered for wireless communication systems to allow multiple transmitters to "collide" in the RF medium as viewed by the receivers for which these transmissions are targeted. In other words, multiuser detection receivers allow transmitters to be allocated the same frequency band at the same time and/or to allow collisions to occur in a packet-based multiple access wireless communication protocol.

In many cases, the addition of the multiuser detector in the receiver, along with a medium access control scheme or other protocol rules will enable such a co-channel interference tolerant radio to work. However, the quality of service (QoS) is difficult to maintain in this new paradigm of interference multiple access (IMA) when the distances between transmitters and receivers and/or the channel quality is dynamically changing. The underlying issues associated with these difficulties are a mix of both familiar problems (similar to those we understand well from typical, main stream, collision avoidance communication systems) as well as those that are unique only to IMA.

One unique problem of IMA receivers occurs when the dynamic range between the interfering signals is very large. In theory, MUD receivers should work extremely well in such a situation because even the simplest suboptimal MUD algorithm can take advantage of the inefficient high power signal. Specifically, in many situations, the high power interfering signal's rate is very low compared to its capacity potential rate based upon its very high, received power. In such a case, this high power signal can, in theory, be detected, recreated, and stripped off to reveal the low power signal underneath.

In an actual system, such as the generic state of the art MUD receiver shown in FIG. 1, the received signal, before it is fed to the MUD processing algorithm, must be collected by the receiver front end. In the receiver front end, comprised of lines and units labeled 340-750 in the figure, the signal power must be adjusted so as not to saturate the receiver. This is done by automatic gain control (AGC) unit 600. After the signal's power is reduced by the AGC, it is sampled by an analog-to-digital converter (A/D) unit 700. The A/D converter unit 700 turns the analog signal into a series of numbers or samples output on line 750. Each of these samples is represented as a block of bits (ones and zeros), where the number of bits in each block used to represent the value of a single sample has been pre-determined and is limited, typically to 8 bits per sample (bps), 12 bps, or 16 bps.

In addition to the AGC and ND operations, the processing that is done within the parameter estimation unit 800 and the MUD processing unit 900 is done with a limited precision on the number of bits per value. This is known in the art of hardware implementations of processing algorithms as fixed precision arithmetic. It is the combination of the AGC, A/D, and fixed precision arithmetic that causes a significant noise-like effect to be applied to the lower power signal.

FIG. 2 is a diagram illustrating a network scenario in which two nodes (node a and node b) endeavor to communicate with one another using a channel that is already in use by two other nodes (node A and node B). Nodes A and B may be communicating with one another at a relatively high power level and nodes a and b may desire to communicate at a much lower power level. As shown, at a particular point in time, node b may receive two signals, a higher power signal received from node A and a lower power signal received from node a. These signals are effectively added together at the receive antenna of node b. The signal from node A represents an interference signal at node b (i.e., an unwanted signal) and the signal from node a is the desired signal. This is one example of a situation where a nearby transmitter might overpower other local communications. Another example might occur in a system where power control is not possible, and where distances could be small or great between transmitting and receiving nodes, and could change over time depending upon parameters such as changing location of transmitters and/or receivers, as well as changes in the destination node(s) for each packet transmission.

If the two signals received at node b are many orders of magnitude different in received power (e.g., greater than 30 dB apart), then the combined effect of the AGC and the A/D can result in the lower of the two signals being "buried" in the combination of receiver noise and a noise-like result that happens when coarse quantization is applied during the sampling process.

Specifically, the received signal at node b may be modeled as coming from four different sources: $r=s+n1+n2+n3$, where s is the signal of interest and n1 is energy from other signals in the environment. Both s and n1 are present at the antenna. The other two noise terms are n2, the receiver analog noise, and n3, the receiver A/D digitization noise. The environment noise, n1, is pushed down by the AGC along with the received signal, s. The other two terms, n2 and n3, are not pushed down by the AGC. Since the AGC is upfront in the receiver chain, n2 includes impacts from the tuner and filters of the receiver. If the receiver has several stages of downconversion (e.g., one or more IF downconversion stages), there will be multiple iterations of tuners/filters, all of which contribute to n2. This means that even if the lower power signal (signal a) were received at the antenna with enough power to be successfully demodulated in the absence of the higher power signal (signal A), once it is combined with the higher power signal, the AGC will push down the total received signal power to a point where the power level of the lower power signal is dramatically lower than its received level. Even if the higher power signal could be stripped off perfectly from this post AGC signal, the rate of the information attempting to be conveyed by the lower power signal will likely be too high compared to the capacity rate dictated by the actual (post-AGC) received signal to noise ratio (SNR) of this signal.

It is possible that the effect of the AGC is not so severe as to cause the received SNR of the lower signal to be too low relative to its rate. In this case, the noise term that will have the most effect is n3, the noise that models the effect of signal quantization. Specifically, after the lower power signal has been reduced in received power by the AGC process, there may simply not be enough bits per sample to represent the small variations that are due only to the lower power of the two interfering signals. Furthermore, the processing that is performed as part of the MUD algorithm must be implemented with limited precision arithmetic. The limited precision adds yet another effect that would not cause a problem if the signals were closer in received power, but that will cause a very noticeable and detrimental effect on the lower power signal when their dynamic range (the difference between the two signal's received powers) is many orders of magnitude.

There are two conventional alternatives to using a MUD receiver to solve the interference problem. The first is to use error correction coding, treating the interference as noise. Even without the effect of the AGC-plus-A/D described above, for cases of high power interference, treating the interference as unstructured noise will result in a very low SNR for the signal of interest, which leads to a extremely low rate link. When we add the effect of the AGC-plus-ND which pushes the lower power signal of interest even lower, down into the noise, link closure, even at very low rates, is no longer possible.

The second alternative in this case is to use the spatial diversity that typically exists among interfering signals. It is very common in commercial wireless systems for the interfering transmitters to be located at different angles of arrival as seen by the receiver. If the receiver is equipped with multiple antennas, as shown in FIG. 3, the receiver could employ any number of digital beamforming algorithms to direct a strong beam toward one of the transmitters and to direct very deep nulls toward the other transmitters.

This digital beamform-only solution requires high-cost technology, and sometimes high computational complexity for needed processing algorithms, hardware devoted to the beamforming processing, as well as multiple antennas and the corresponding receiver ports. In addition, to attempt to provide sufficient quality of service under many typical conditions, the number of antenna elements needs to be greater than the total number of anticipated interfering transmitters. This is unrealistic for most size/weight/power requirements of most wireless communication receivers. Even with all these necessary components, there are still many cases in which the signals are not spatially separable to the level required for reliable communication. Moreover, the limited dynamic range issue is still present in conventional state of the art digital beamforming approaches, such as illustrated in FIG. 3.

A much lighter and cheaper, but less effective, solution could be built with as few as two receive antennas and by using analog beamforming instead of digital beamforming. Such a receiver would provide some capability in adjusting the received powers of interfering signals, but alone, would almost always suffer unreliable links due to the unsuppressed co-channel interference.

SUMMARY

The concepts, systems, circuits, and techniques described herein can make use of cheaper, lighter, less capable analog beamforming technology to address problems caused by an AGC, A/D, and/or fixed precision arithmetic that can leave a MUD severely crippled or even inoperable in a high dynamic range scenario.

In order to accomplish reliable reception of interfering signals in changing environments that are typical of those experienced by commercial wireless systems, the concepts, systems, circuits, and techniques described herein may rely upon an ability of the receiver to sense and characterize the situation that it faces as well as to provide a cognitive ability to intelligently and automatically (e.g., without input from a human) control the receiver parameters to result in a receive beam being chosen that increases the likelihood of success of the MUD processing for any given situation as it occurs.

The concepts, systems, circuits, and techniques described herein find use in a wide variety of application areas including, but not limited to, wireless communication such as that provided by the 4G (LTE) cellular, IEEE 802.11 (Wi-Fi), or IEEE 802.16 (WiMAX) wireless standards and equipment.

The concepts, systems, circuits, and techniques described herein allow different wireless networks and/or radios to co-exist in the same frequency band at the same time, causing interference with one another (i.e., they can interfere on purpose) and the concepts, systems, circuits, and techniques described herein can help alleviate the spectrum congestion problem that plagues commercial wireless systems.

It should thus be appreciated that, in general, the concepts, systems, circuits, and techniques described herein may find use in any application in which it is necessary or desirable to allow different signals to propagate in a manner such that the signals interfere with one another. The concepts, systems, circuits, and techniques described herein can be used to receive such interfering signals and process the interfering signals to provide a useful result (e.g., the ability to increase an amount of information transmitted or otherwise exchanged between two points (a source and a destination) over a band limited channel or transmission media).

In one exemplary application, the concepts, systems, and techniques described herein allow different wireless networks and/or radios to co-exist in the same frequency band at the same time, causing interference with one another (i.e., the networks/radios, etc., will interfere on purpose) without different providers and mobile nodes having to conform to a single waveform or coordination-enabling protocol. The different interfering networks/systems do not require pre-specified coordination/cooperation protocols or means of direct communication with each other to negotiate a satisfactory sharing of the same band.

The concepts, systems, circuits, and techniques described herein may enable backward compatible operation with radios that do not possess the capabilities of the novel concepts, systems and techniques, where conventional radios would maintain high functionality in the presence of the impeded "spectrum share."

In some embodiments, a communication receiver includes a multiuser detector (MUD), two or more receive antennas, a coarse analog beamforming capability, and a cognitive engine internal to the radio that is capable of making beamforming and internal radio receiver control decisions on-the-fly, in reaction to at-that-moment interference level, location, channel conditions, and achieved quality of service. The concepts, systems, circuits, and techniques described herein enable reliable reception of interfering signals that otherwise would not be successfully received and decoded by either of the individual methods of MUD or analog beamforming or by pre-determined combinations of MUD and analog beamforming.

In accordance with one aspect of the concepts, systems, circuits, and techniques described herein, a communication device is provided for use in a multi-signal wireless environment having a signal of interest and one or more other signals in a common frequency band. More specifically, the communication device comprises: multiple antenna ports for connection to multiple antennas; at least one analog beamformer to form different receive beams for the multiple antennas, each receive beam to receive a different combination of the signal of interest and the one or more other signals; a multi-user detector (MUD) that is capable of demodulating a signal of interest within a composite signal; and a cognitive engine to intelligently select one or more receive beams that will result in a dynamic range between the signal of interest and the one or more other signals that are delivered to the MUD that is favorable for successful detection of the signal of interest in the MUD.

In one embodiment, the communication device further comprises a parameter estimator to estimate one or more signal quality metrics for each signal within each of a plurality of receive beams generated by the at least one analog beamformer, wherein the cognitive engine is configured to select the one or more receive beams based, at least in part, on the signal quality metrics estimated by the parameter estimator.

In one embodiment, the one or more signal quality metrics estimated by the parameter estimator includes a signal to noise ratio (SNR).

In one embodiment, the parameter estimator is configured to estimate one or more low quality signal parameters associated with signals received within receive beams generated by at least one analog beamformer; and the cognitive engine is configured to select one or more receive beams based, at least in part, on the low quality signal parameters.

In one embodiment, the cognitive engine includes a beam grading unit to provide grades for beams or beam combinations that are indicative of the beams or beam combinations respective advantage provided to the demodulator for the specific signals of interest; and the parameter estimator includes an optimization unit coupled to receive the beam grades from the beam grading unit and to use the grades to optimize the beams for which low quality signal parameters are generated in a recursive fashion.

In one embodiment, the one or more low quality signal parameters estimated by the parameter estimator include at least one of: a number of coexisting signals, a baud rate for each signal, baud timing for each signal, carrier offset for each signal, error correction coding rate for each signal, and modulation scheme for each signal.

In one embodiment, the at least one analog beamformer includes multiple combiners that are each configured to linearly combine signals received at the multiple antennas in a different manner, wherein an output of each of the multiple combiners is coupled to an input of the parameter estimator.

In one embodiment, the communication device further comprises a beam selector switch coupled to outputs of the multiple combiners to select, under control of the cognitive engine, one or more of the beams generated by the multiple combiners for further receiver processing.

In one embodiment, the at least one analog beamformer includes a linear combiner having configurable combining weights, the linear combiner having an output that is coupled to an input of the parameter estimator, wherein the linear combiner is capable of achieving a variety of different receive beams if the combining weights are varied.

In one embodiment, the communication device further comprises a weight generation unit to generate weights for the linear combiner under control of the cognitive engine to achieve different receive beams.

In one embodiment, the communication device further comprises a receive chain having an automatic gain controller followed by an analog to digital converter, wherein the parameter estimator includes a gradient calculator to determine gradients between linear combiner weights and a dynamic range of a signal at the output of the automatic gain controller, the parameter estimator to deliver the gradients to the cognitive engine for use in updating the weights of the linear combiner.

In one embodiment, the parameter estimator includes a direction of arrival estimator to estimate angles of arrival of signals within the plurality of receive beams.

In one embodiment, the parameter estimator includes a beam dynamic range estimator to estimate dynamic ranges between the signal of interest and other signals in different receive beams using the direction of arrival information generated by the direction of arrival estimator and known beam patterns associated with the different receive beams; and the cognitive engine is configured to select the one or more receive beams based, at least in part, on the estimated dynamic ranges.

In one embodiment, the cognitive engine is configured to deliver information identifying a selected beam or beams to the MUD.

In one embodiment, the cognitive engine includes an operating point determination unit to identify an operating point of the communication device based, at least in part, on powers and rates associated with signals received at the multiple antennas, and a beam grading unit to determine if each of the available receive beams or beam combinations is feasible for use at the operating point and, if so, to determine a grade for the beam or beam combination.

In one embodiment, the cognitive engine further includes an ordered beam list generation unit to generate a list of beams or beam combinations in order of preference based, at least in part, on the grades determined by the beam grading unit, the ordered beam list generation unit being configured to: (a) generate a list of beams in grade order if a single-beam MUD is being used, (b) generate a list of beam combinations if a multi-beam MUD is being used, and (c) generate a list of beams or beam combinations in an order that the beams or beam combinations should be used by the MUD if a beam-recursive MUD is being used.

In one embodiment, the cognitive engine is configured to select the one or more receive beams based, at least in part, on one or more high quality signal parameter estimates generated as a byproduct of the MUD.

In one embodiment, the cognitive engine is configured to select the one or more receive beams based, at least in part, on quality of service (QoS) information.

In one embodiment, the communication device includes multiple MUDs using different MUD processes; and the cognitive engine is configured to select the one or more receive beams based, at least in part, on the different MUDs that are available in the communication device.

In one embodiment, the communication device comprises a single type of MUD and the cognitive engine is configured to select one beam, one beam combination, or a list of beams based, at least in part, on the type of MUD that is available in the communication device.

In one embodiment, the communication device includes a handheld wireless communicator.

In one embodiment, the communication device includes a base station or wireless access point.

In one embodiment, the communication device includes an integrated circuit.

In one embodiment, the communication device includes a femto-cell unit for use in a cellular communication system.

In one embodiment, the communication device includes a gateway unit for use in WiFi hotspots.

In one embodiment, the at least one analog beamformer is only capable of coarse beamforming.

In accordance with another aspect of the concepts, systems, circuits, and techniques described herein, a method is provided for use in detecting and demodulating a signal of interest in a multi-signal wireless environment. More specifically, the method comprises: receiving signals using multiple receive beams associated with a plurality of antennas, wherein each receive beam outputs a composite signal having a different combination of the signal of interest and one or more other signals; and selecting one or more of the multiple receive beams to be coupled to a multi-user detector (MUD) to demodulate the signal of interest, wherein selecting one or more of the multiple receive beams includes selecting one or more receive beams that will produce an estimated dynamic range between the signal of interest and the one or more other signals that is favorable for demodulation of the signal of interest in the MUD.

In one embodiment, selecting one or more of the multiple receive beams includes selecting one or more receive beams that produce an estimated dynamic range between the signal of interest and the one or more other signals that is best for detection of the signal of interest in the MUD from amongst the multiple receive beams.

In one embodiment, receiving signals using multiple receive beams includes receiving signals using multiple different combiners that are each coupled to the plurality of antennas, wherein each combiner generates a different receive beam.

In one embodiment, receiving signals using multiple receive beams includes receiving signals using a linear combiner having variable combining weights that is coupled to the plurality of antennas, wherein the combining weights are varied to achieve the multiple receive beams.

In one embodiment, the method further comprises estimating gradients between combining weights of the linear combiner and a dynamic range of a signal at the output of an automatic gain controller; and using the gradients to update the combining weights of the linear combiner.

In one embodiment, the method further comprises estimating parameters associated with signals output by each of the multiple receive beams; wherein selecting one or more of the multiple receive beams includes selecting the one or more receive beams based, at least in part, on the estimated parameters.

In one embodiment, estimating parameters associated with signals output by each of the multiple receive beams includes estimating a signal quality metric for each signal output by each receive beam, wherein selecting one or more of the multiple receive beams includes selecting the one or more receive beams based, at least in part, on the estimated signal quality metrics.

In one embodiment, selecting one or more of the multiple receive beams includes selecting the one or more receive beams based, at least in part, upon the signal quality metric of signal to noise ratio (SNR).

In one embodiment, estimating parameters includes estimating one or more low quality signal parameters associated with signals output by each receive beam, wherein selecting one or more of the multiple receive beams includes selecting the one or more receive beams based, at least in part, on the estimated low quality signal parameters.

In one embodiment, the one or more signal parameters include at least one of: number of coexisting signals, baud rates of signals, baud timing of signals, carrier offsets of signals, error correction coding rates of signals, and modulation schemes of signals.

In one embodiment, estimating parameters includes estimating angles of arrival associated with the one or more other signals output by the multiple receive beams.

In one embodiment, estimating parameters includes estimating a dynamic range between the signal of interest and the other signals in the composite signal associated with each of the multiple receive beams using the estimated angles of arrival, wherein selecting one or more of the multiple receive beams includes selecting the one or more receive beams based, at least in part, on the estimated dynamic ranges.

In one embodiment, selecting one or more of the multiple receive beams to be coupled to a multi-user detector (MUD) to detect the signal of interest includes: (a) determining an operating point based, at least in part, on powers and rates associated with signals received at the plurality of antennas; (b) grading beams to determine if each of the available receive beams or beam combinations is feasible for use at the operating point; (c) if an available receive beam or beam combination is feasible for use at the operating point, determining a grade for the beam or beam combination; and (d) generating an ordered list of beams or beam combinations in order of preference based, at least in part, on the grades determined by the beam grading unit.

In one embodiment, selecting one or more of the multiple receive beams includes selecting the one or more receive beams based, at least in part, on one or more high quality signal parameters generated by a high quality parameter estimation unit.

In one embodiment, selecting one or more of the multiple receive beams includes selecting the one or more receive beams based, at least in part, on quality of service (QoS) information.

In one embodiment, multiple different MUDs are available for use in detecting the signal of interest; and selecting one or more of the multiple receive beams includes selecting the one or more receive beams based, at least in part, on the different MUDs that are available.

In one embodiment, selecting one or more of the multiple receive beams includes selecting the one or more receive beams based, at least in part, on the modulation and/or information rate of the interfering signal.

In one embodiment, the method further comprises delivering information identifying the one or more selected receive beams to the MUD.

BRIEF DESCRIPTION OF THE DRAWINGS

The foregoing features may be more fully understood from the following description of the drawings in which.

DETAILED DESCRIPTION

Figure 1:
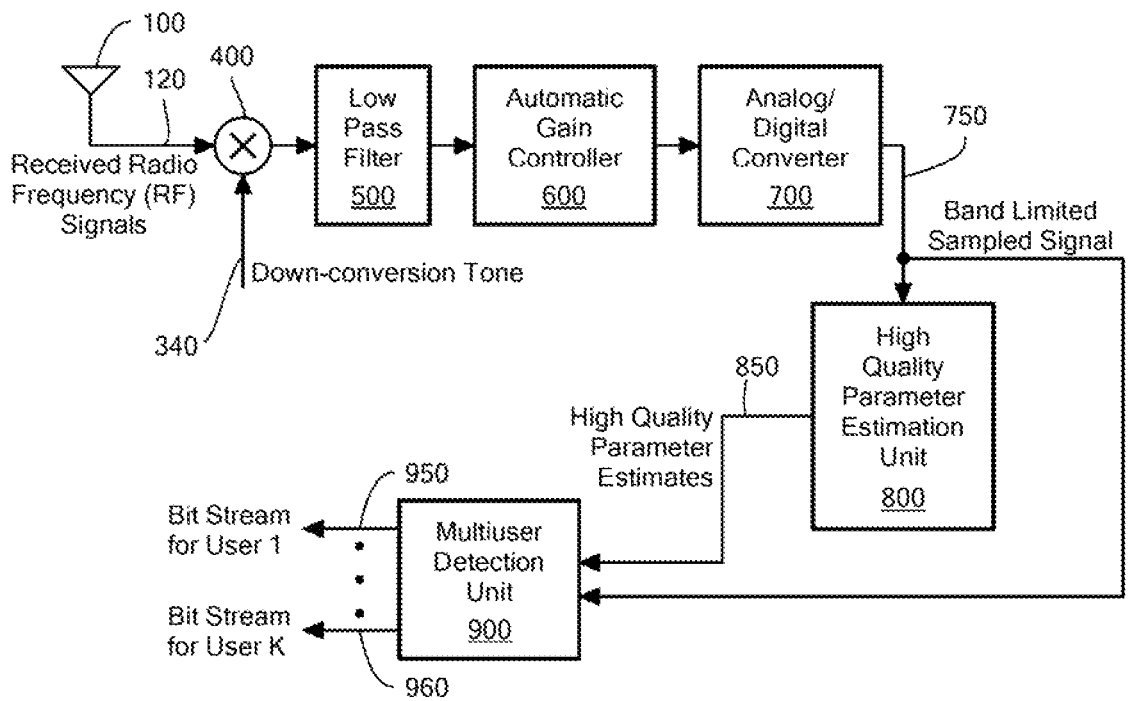
FIG. 1 is a block diagram illustrating a conventional MUD receiver arrangement.

Before describing a coexistence cognitive radio (CECR) and related methods, some introductory concepts and terminology are explained. As an initial matter, it should be appreciated that the concepts, systems, and techniques described herein find use in a wide variety of application areas.

For example, the concepts, systems, and techniques described herein for processing and/or making use of interfering signals find application in a wide variety of application areas including, but not limited to: magnetic storage media, magnetic storage systems, signal propagation systems (e.g., systems including cable or other physical transmission media), wireless networks or systems (e.g., wireless medical systems, satellite communications (SATCOM) systems, optical communications systems, wireless networking systems, wireless cellular systems, and/or others), and wired communications systems (e.g., communications over a cable or other type of wire or conductor).

The above notwithstanding, to promote clarity and understanding, the broad concepts, systems, and techniques of the present disclosure are discussed below in the context of a wireless communication system. This is not intended to be limiting and should not be construed as such. That is, as described above, the broad concepts described herein apply to a wide variety of different fields of use.

Communicating data from one location to another requires some form of pathway or medium between the two locations. In telecommunications and computer networking, a communication channel, or more simply "a channel," refers to a connection between two locations over a transmission medium. The connection may, for example, be a logical connection and the transmission medium may be, for example, a multiplexed medium such as a radio channel. A channel is used to convey an information signal (e.g., a digital bit stream, etc.) from one or more source or sending nodes (or, more simply, "sources" or "transmitters") to one or more destination or receiving nodes (or, more simply, "destinations" or "receivers"). Regardless of the particular manner or technique used to establish a channel, each channel has a certain capacity for transmitting information, often measured by its frequency or bandwidth in Hertz or its data rate in bits per second.

A coexistence cognitive radio (CECR) and related techniques as described herein are capable of assessing a frequency spectrum, determining candidate bands in which other independent radios are already operating, and successfully sharing access of an already occupied frequency band with an independent radio system. CECRs may successfully transmit and receive in a pre-occupied band without prohibiting the operation of a pre-existing radio system that was already operating in that band. Moreover, the pre-existing radio system already operating in that band requires no additional capabilities to co-exist with the subject CECR system. Specifically, the pre-existing radio system is not expected to communicate with the coexistence cognitive radio to accomplish the virtual negotiation to settle upon an agreeable coexistence of the two systems.

Figure 4:
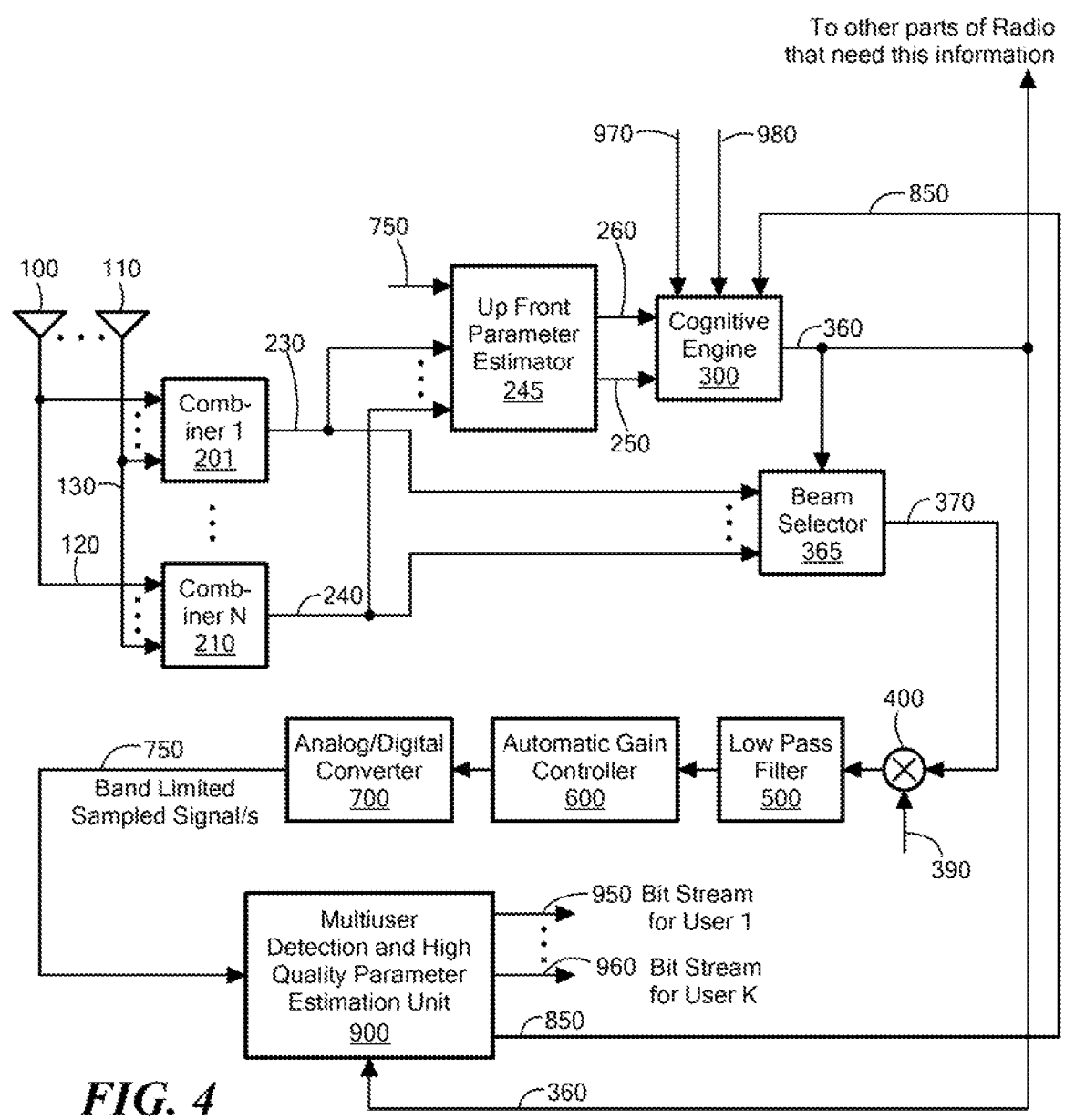
FIG. 4 is a block diagram illustrating an exemplary receiver in accordance with an embodiment.

FIG. 4 is a block diagram illustrating an exemplary receiver in accordance with an embodiment. The receiver of FIG. 4 may be part of, for example, a coexistence cognitive radio (CECR) or other radio system. As shown, multiple antennas 100, 110 supply signals 120, 130 to a set of fixed linear combiners 201, 210 which may serve as beamformers. Combiner outputs 230, 240 are passed to an up front signal parameter estimation unit 245. Estimation unit 245 computes a list of SNR's for each signal in each beam and passes this information to a cognitive engine 300 along line 250. Estimation unit 245 may also compute low quality signal parameter estimates, such as the number of coexisting signals, baud rates and baud timing, carrier offsets, modulation schemes, etc. These low quality parameter estimates are passed to the cognitive engine 300 along line 260. The cognitive engine 300 may also receive quality of service (QoS) information and relevant waveform parameters on input line 970, information on one or more MUD algorithm types implemented in the receiver on input line 980, and high quality parameter estimates for current beams (if available) on input line 850. The cognitive engine 300 evaluates all options given the available information and provides a decision as to which beam or beams to use (e.g., a single combiner output if the MUD is a single-beam MUD, a set of beams if the MUD is a multi-beam iterative MUD, etc.). A combiner list may be output to the beam selector unit 365 along line 360. The chosen combiner output(s) are passed along line 370 for conventional down conversion and baseband sampling in mixer 400, low pass filter (LPF) 500, automatic gain controller (AGC) 600, and analog to digital (ND) converter 700. The particular combiner (or combiners) chosen may be one (or a set) that exhibits favorable dynamic range(s) for the signals of interest, so that the MUD algorithm performs favorably.

The cognitive engine 300 receives input as available from other units within the receiver. The most rudimentary functioning of this unit is possible with no more than the list of SNR's for each signal for each beam as provided by the up front signal parameter estimation unit 245, the type of MUD implemented in the receiver as provided on line 980, and either an estimated modulation rate and, if possible, an error correction coding rate from line 260 or a known modulation and, if known, a coding rate from line 970. For some state of the art radios, means other than up front signal parameter estimation unit 245 may be used to provide the low quality signal parameter estimates to cognitive engine 300.

If more information is available, such as quality of service measurements on line 970, the cognitive engine 300 may be capable of improved decision making. Further, if available, the cognitive engine 300 may be capable of high quality refinements using the high quality signal parameters on line 850 that would be a by-product of the MUD processing within unit 900.

Figure 5:
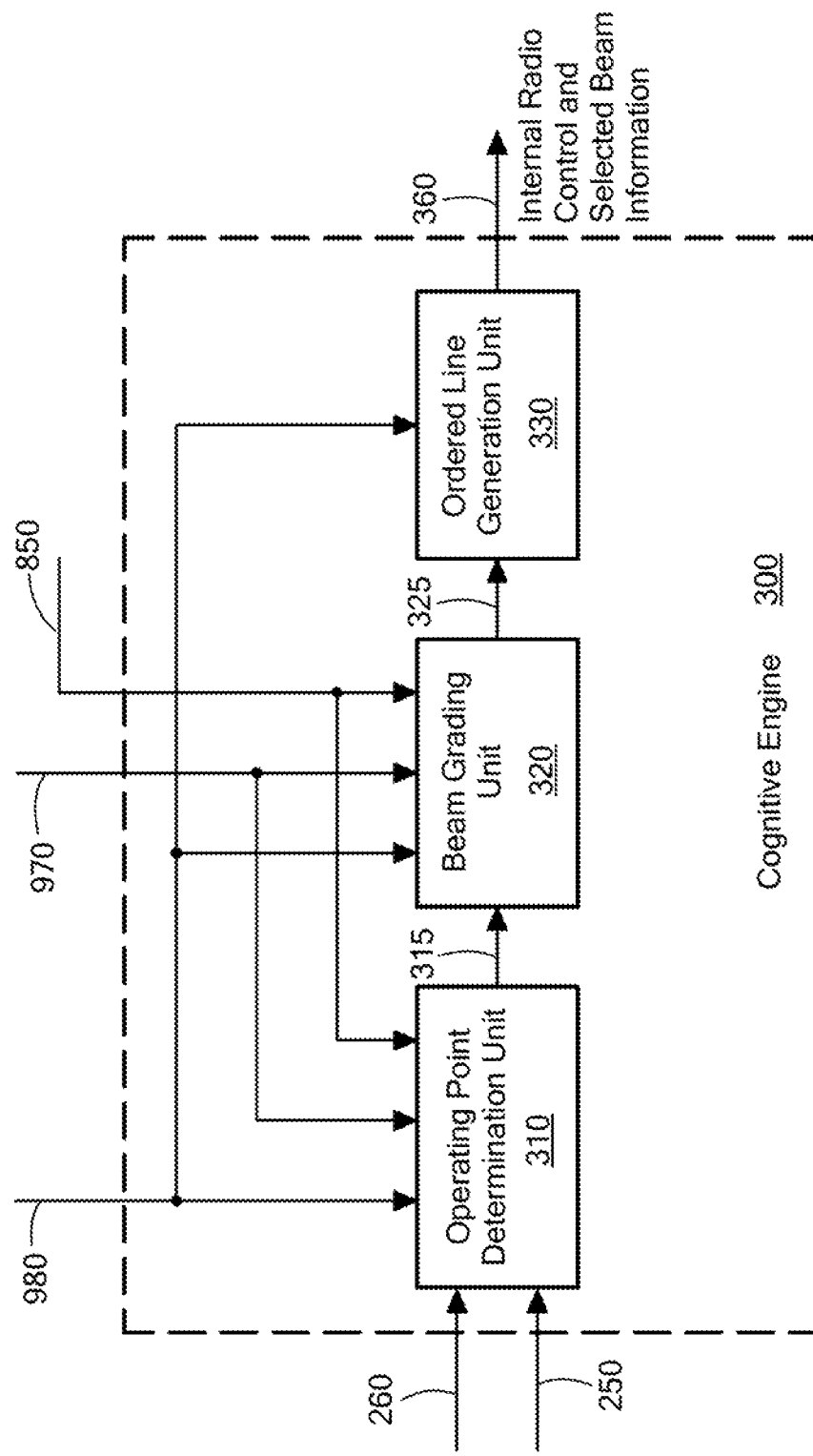
FIG. 5 is a block diagram illustrating functionality within an exemplary cognitive engine in accordance with an embodiment.

FIG. 5 is a block diagram illustrating functionality within an exemplary cognitive engine 300 in accordance with an embodiment. As shown, cognitive engine 300 may include: an operating point determination unit 310, a beam grading unit 320, and an ordered beam list generation unit 330. The operating point determination unit 310 determines the current operating point. The operating point, which is output by unit 310 along line 315, is defined by the rates of all the signals "seen" by the receiver as well as the MUD algorithm that has been implemented within the receiver. The beam grading unit 320 performs a test to determine if an operating point is feasible for each possible beam or combination of beams under consideration. If it is feasible, this unit then computes a grade that scores the level of "goodness" of this beam or combination of beams for the MUD processing that will be performed. If the operating point is not feasible, the beam grading unit provides the lowest possible grade for that beam or combination of beams for the given operating point. The list of graded beams or combination of beams is output along line 325. The ordered beam list generation unit 330 puts the list of beams or beam combinations in the order that should be used by a beam-recursive MUD, if a beam-recursive MUD is to be used. Note that the list for a beam-recursive MUD is not a simple grade-ordered list. If a non-beam-recursive MUD is to be used, then a grade-ordered list still may be provided along line 360, but only the beam or combination of beams with the highest grade will be used. Unit 320 could implement any appropriate evaluation algorithm for determining the probability of success or similar metric for a given multiuser detector operating on a specific set of interfering signals as "seen" via a single beam MUD, multi-spatial MUD acting on a combination of beams, or when processed with a beam-recursive MUD. One suitable method and apparatus for use as unit 320 is described in PCT Patent Application No. PCT/US2013/031900 entitled "Method And Apparatus For Rate Determination In A Radio Frequency System."

Figure 2:
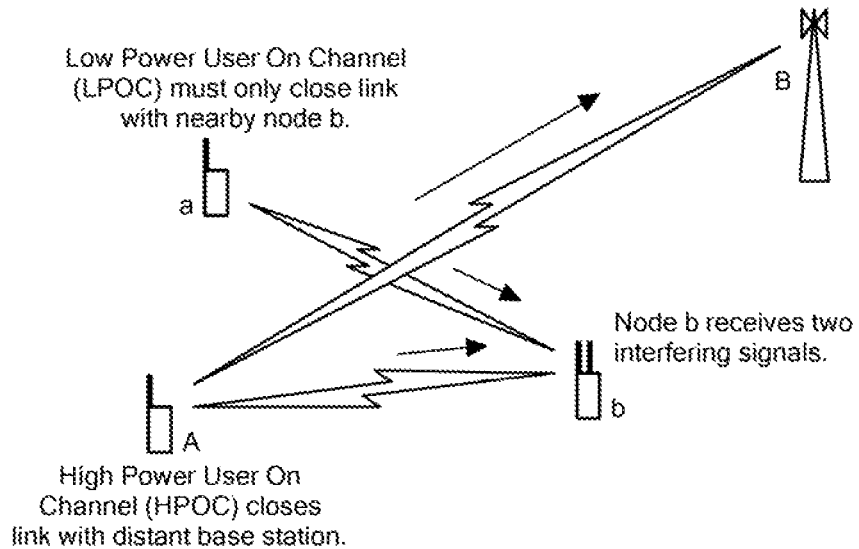
FIG. 2 is a diagram of a network scenario in which a pair of nodes that endeavor to use the same channel as is already in use communicate. This pair is called the second-user-on-channel (SUOC)
Figure 3:
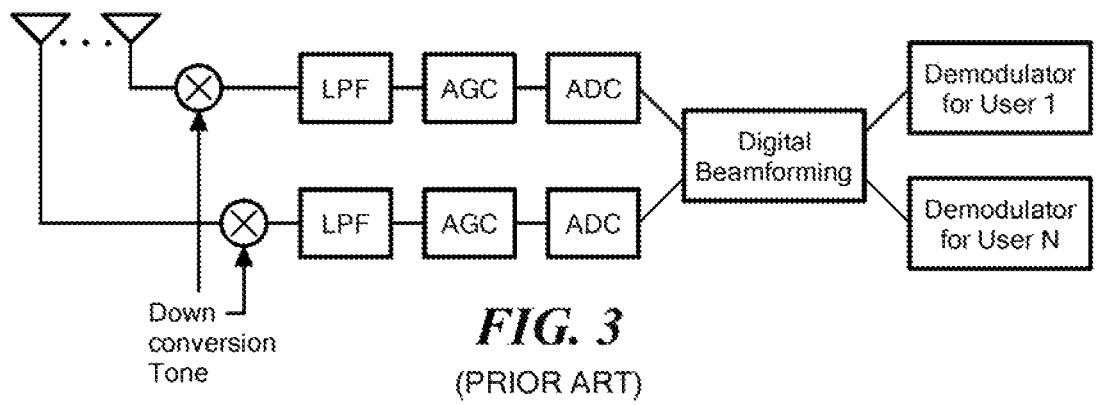
FIG. 3 is a block diagram illustrating a receiver arrangement that uses multiple antennas and digital beamforming to direct a strong beam toward one of two transmitters and a strong null toward the other.

As will be described in greater detail, in at least one embodiment, the receiver of FIG. 4 is used in a scenario where pre-existing choices have been made for both the transmit powers and modulation and coding rates for each of the transmitters that can be "heard" by a subject receiver. It should be appreciated that Node b as shown in FIG. 2 is assumed, for this exemplary instantiation, to have no control over the transmit powers or rates of the multiple signals it receives. Another approach that would enable cooperative on-the-fly autonomous adaptation of these parameters as described, for example, in U.S. application Ser. No. 61/723, 639 entitled, "Cognitive Radio Method and Apparatus for Achieving Ad Hoc Interference Multiple Access Wireless Communication."

It should be noted that there are multiple modes of operation possible for the receiver of FIG. 4. There is, for example, (1) a single beam MUD mode, (2) a multiple beam non-recursive MUD mode, and (3) a multiple beam recursive MUD mode. The functionality of the multiple beam non-recursive MUD mode is a straightforward extension of the single beam MUD mode. It is known in the art that a single receiver port MUD can be extended to a multiple receiver port or multiple-beam MUD. Thus, in various embodiments described herein, if there are multiple receive antennas, it is not necessary to feed all of the signals collected on all of the antennas into the MUD. Instead, to head off the issue associated with the dynamic range problem, one or more formed beams can be fed into the MUD. If more than one beam is fed to the MUD, then it is a multi-beam or multi-spatial MUD. If only one beam is fed to the MUD, it is a single port MUD (but the MUD algorithm will be essentially the same). Each of these different MUD types may be used in the various embodiments described herein. An example of a multiple beam (or multi-spatial) non-recursive MUD is described in U.S. Pat. No. 7,724,851 to Learned et al., which is hereby incorporated by reference herein in its entirety. A beam recursive MUD could also be a multi-spatial beam recursive MUD where the first pass is with one set of beams, the second pass is with a different set of beams, and so on.

A description will now be made of the single beam mode of operation. Conventional beamforming, which is well-known and finds application in point-to-point links and MIMO systems, attempts to maximize the channel response in one direction, while greatly diminishing the response in other directions. Very sharp beams are typically desired to maximize the dynamic range between one primary signal and other secondary, undesired signals. In contrast, an approach described herein is to choose beams that reduce the dynamic range between signals. This will allow a realistic MUD algorithm to be employed wherein the multiuser capacity region or achievable rate region is favorable for the MUD that has been implemented within the receiver. In the discussion that follows, the technique will be described in the context of two signals. However, persons skilled in the art will appreciate that the techniques easily extend to greater number of signals.

Making the two signals much closer in power level (i.e., lowering dynamic range) is done at the expense of the SNR of the higher power signal. This must therefore be done carefully so that the rate for that higher power signal, after the application of the beam, is not too high relative to its "new" SNR. For example, if a dynamic range of 10 dB between signals is sufficient to eliminate the "quantization noise" caused by the combination of the automatic gain control and the A/D converter, and the normalized interference between those two signals is maximal (mathematically, the time-space received signature pulses would be nearly collinear in such a case), then it is best to work toward choosing or creating a beam to provide the desired 10 dB dynamic range because that will give the implemented MUD algorithm the best operating point. If the time-space signature pulses were less than maximally interfering, then a smaller dynamic range could be tolerated. The operating point determination unit 310 would provide appropriate evaluation regarding this trade.

In one approach, to enable the ability to reduce or alter the received dynamic range between co-channel signals, a selection may be made among multiple linear combinations of spatial waveforms. That is, a set of linear combinations of antenna data, also known as "beams", are capable of being formed. The directional response of each combination (i.e., the "beam pattern") can be either known or unknown, and either fixed or variable, in different embodiments.

Referring back to FIG. 4, in one exemplary embodiment, the multiple antennas 100, 110 supply signals to a set of fixed linear combiners 201, 210. One combiner output is chosen for conventional down conversion and baseband sampling. The particular combiner chosen is one that exhibits favorable dynamic ranges for the signals of interest, so that the MUD algorithm behaves favorably.

Figure 6:
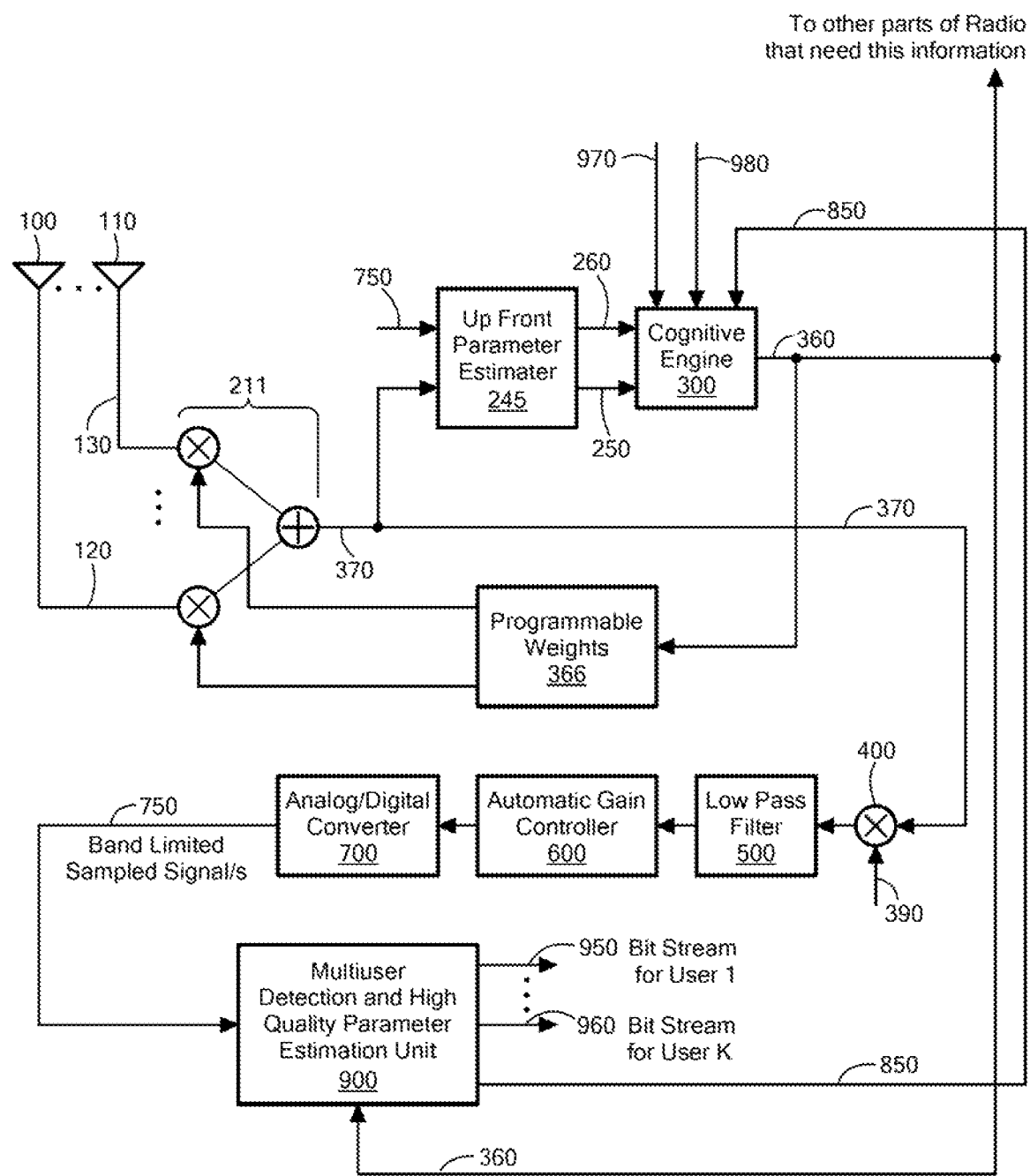
FIG. 6 is a block diagram illustrating another exemplary receiver in accordance with an embodiment.

FIG. 6 is a block diagram illustrating another exemplary receiver in accordance with an embodiment. As shown, the receiver of FIG. 6 includes a single programmable linear combiner 211. A programmable weight unit 366 is used to supply programmable weights to provide the linear weighting used by a multiply-add operation in combiner 211.

Figure 7:
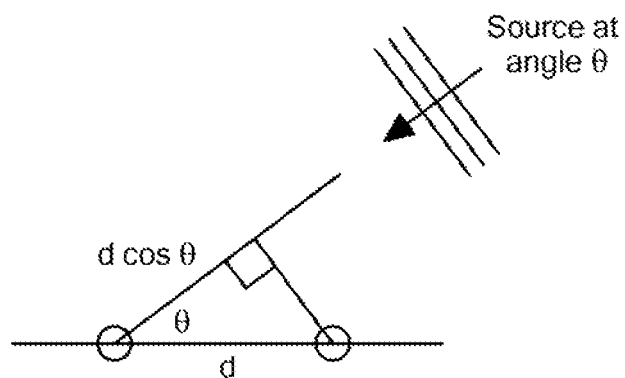
FIG. 7 is a diagram illustrating properties associated with two adjacent dipole antennas separated by a distance d that receive energy from a source at angle θ.
Figure 8:
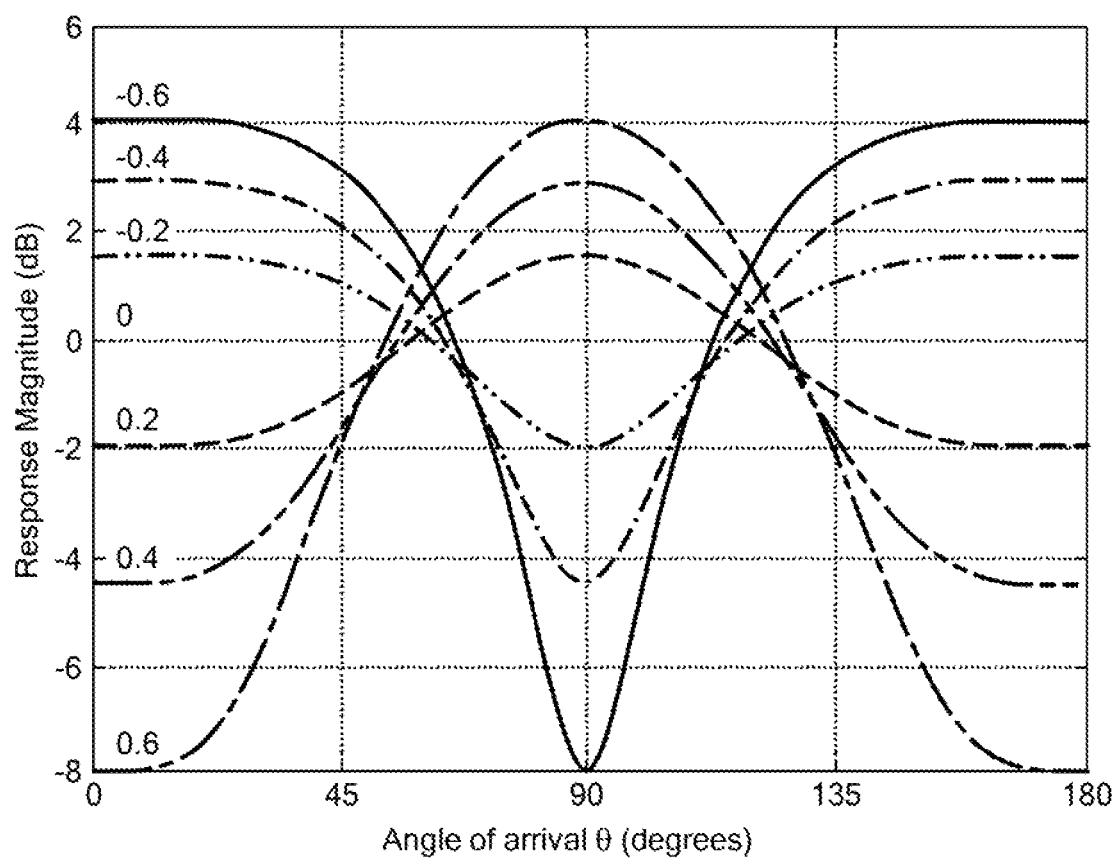
FIG. 8 is a diagram illustrating some antenna responses that are achievable using different weighting schemes to linearly combine the antennas in FIG. 7.

In one embodiment, arrays of dipoles are used for the antennas 100, 110 of FIG. 6. A dipole has an omnidirectional response pattern (in the plane). As illustrated in FIG. 7, two dipoles separted by a distance d receive energy from a signal at angle θ with center frequency f=c/λ, where c is the speed of light and λ is the wavelength. If the outputs of the two antennas are combined with weights $w_1$ and $w_2$, the equivalent complex baseband response is:

$$w_1 + w_2 e^{j 2\pi d/\lambda \, \cos(\theta)} \quad (1),$$

which depends on the angle of arrival θ. FIG. 8 shows some obtainable responses for various linear combinations $w_1$ and $w_2$. As can be seen, responses varying from mildly directional to those with deep nulls can be obtained. Many other antenna configurations and combining approaches are possible.

An implementation such as shown in FIG. 6 may utilize a small subset of responses. These can be conventionally obtained through use of fixed amplifiers or attenuators, resistive combiners, PIN diodes, or any combination of the above. Such an implementation may also allow the weights $w_1$ and $w_2$ to be set arbitrarily. These can be obtained, for example, by using programmable amplifiers or attenuators.

The spatial response patterns of the antennas 100, 110 can be either known or unknown. Different algorithms may be applied depending on the situation.

Figure 9:
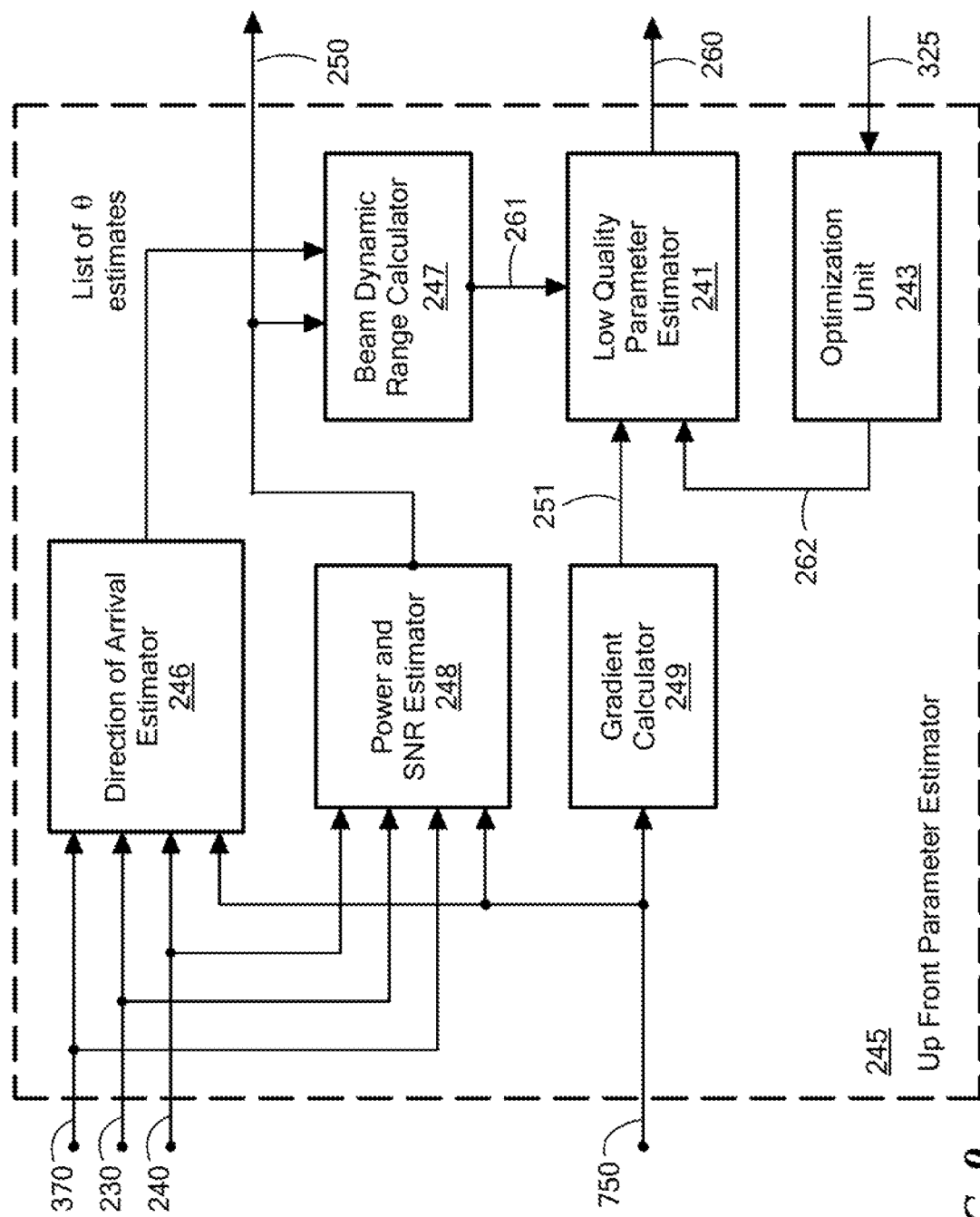
FIG. 9 is a block diagram illustrating functionality within an up front parameter estimator unit in accordance with an embodiment.

The up front parameter estimator unit 245 of FIG. 4 computes parameters needed by the cognitive engine 300 from raw RF linear combiner outputs on lines 230, 240 and from the A/D converter output on line 750. Similarly, the up front parameter estimator unit 245 of FIG. 6 computes parameters needed by the cognitive engine 300 from an output of a single variable linear combiner 211 on line 370 and the A/D converter output on line 750. FIG. 9 is a block diagram illustrating functionality within up front parameter estimator unit 245 in accordance with an embodiment. For the case where the antennas 100, 110 have known beam patterns, a first step may be to estimate the directions-of-arrival of each of the desired sources in a local coordinate system, indexed by angle θ, using the direction of arrival estimator 246 of FIG. 9. Any conventional direction-of-arrival estimation technique may be used. Well known techniques include, but are not limited to: MUSIC, ESPRIT, Maximum-Likelihood, weighted subspace fitting, the single channel DF method disclosed in U.S. Pat. No. 7,126,533, and related methods. Pure analog methods, such as the known analog subspace tracking approach can be used utilizing the information on lines 230-240, or pure digital methods using the digital signal on line 750 and the technique of U.S. Pat. No. 7,126,533 can be used. The estimated direction of arrivals are combined with the known antenna beam patterns and RF linear combiner patterns by unit, to enable choice of the best linear combination by the cognitive engine 300.

For a fixed set of N known RF linear combiners and known antenna array patterns, let the $n^{th}$ known combined beam pattern be denoted by $b_n(\theta)$, for n=1, ..., N, where θ indexes the direction-of-arrival. The parameter $b_n(\theta)$ is then the complex amplitude response of combination n to a unit-amplitude signal from direction θ.

Let the direction-of-arrival estimates of the two sources be denoted by $\theta_1$ and $\theta_2$, and the powers of the two sources be denoted by $p_1$ and $p_2$, respectively. Without loss of generality, we assume $p_1 \geq p_2$. The options for dynamic range compression may be calculated by the beam dynamic range calculator 247 according to:

$$\frac{p_1 |b_n(\theta_1)|^2}{p_2 |b_n(\theta_2)|^2} \quad (2)$$

for n=1, ..., N. These are communicated on line 261 to the low quality parameter estimator 241.

For systems where N is very large, which may occur, for example, in systems with programmable amplifiers, it may not be cost effective or practical to enumerate all combinations and test equation (2) exhaustively. Instead, it is more efficient to collect all the degrees of freedom that the system can control into a vector m. The elements of m might be amplifier gain settings and phase shift settings, or perhaps physical settings to control the orientation of physically steerable antennas. The parameter $b_m(\theta)$ is now commonly referred to as an "array manifold", and the beam dynamic range calculator 247 supplies the function of m:

$$\frac{p_1 |b_m(\theta_1)|^2}{p_2 |b_m(\theta_2)|^2} \quad (3)$$

on line 261 instead of providing the values of dynamic range as is done when the number of beams is low. Also, in this case, unit 241 of FIG. 9 would provide an estimate or prediction of the low quality parameter estimates for one or more values of m. A fine tuning iterative process would ensue between the cognitive engine 300 and the up front parameter estimator 245 that would result in a final iteration and output on line 325 of FIG. 5 that would correspond to a "high-grade" dynamic range and the corresponding setting for m, which would define the beam that would provide this high-grade dynamic range. Specifically, the value or values of m used in unit 241 of FIG. 9 would be adjusted by the optimization unit 243 which could employ any well known optimization or search algorithm known to those skilled in the art of optimization. Optimization unit 243 takes as input a beam grade and its corresponding value of m or a list of beam grades and their corresponding values of m on line 325 from the beam grading unit 320 of FIG. 5. The optimization unit 243 of FIG. 9 then provides a new value or values of m on line 262 to unit 241 for another iteration of low quality parameter estimation corresponding to the new value or values of m. This continues until the optimization unit 243 determines that no more iterations are necessary or until some threshold number of iterations has been reached.

A power and SNR estimator 248 within the up front parameter estimator 245 of FIG. 9 operates in a tracking loop via line 750. The estimator 248 assumes only one RF linear combiner is operating at a time. Combiners are switched periodically and at a faster rate than the changes in channel parameters so that the signal powers and multipath environment do not appreciably change during the processing snapshot. The estimator 248 also assumes the array manifold is known and the direction of arrival estimates are tracked (so that array response matrix A is entirely known). It also assumes that the noise power $\sigma^2$ is being tracked.

If the n$^{th}$ RF linear combiner measurement output is denoted by:

$$y_n^H = c_n^H A S_n$$

for n=1, ..., N, where $c_n$ is the linear combiner weighting vector, and $S_n$ is the matrix of source transmissions for the n$^{th}$ measurement (one source per row), and the superscript H denotes the Hermitian transpose operation. The following steps may be used to calculate the signal powers and SNRs:
1) Calculate the combined array response and RF linear combiner response $d_n^H = c_n^H A$, and calculate the average power for the n$^{th}$ combiner output via $$r_n = \frac{1}{K} y_n^H y_n.$$

Note that:

$$r_n = c_n^H A \left( \frac{1}{K} S_n S_n^H \right) A^H c_n = d_n^H P d_n = |d_n|^{2T} p \quad (4)$$

where $|d_n|^2$ denotes the column vector of the magnitude-squared of the elements of $d_n$ and p denotes the main diagonal of P reshaped into a column vector. Note that this assumes that the source's powers remain reasonably constant across RF linear combiner measurements, but that the actual transmitted symbols are allowed to vary.
2) Stack the $r_n$ in equation (4) into a column vector as follows:

$$r = \begin{bmatrix} r_1 \\ \vdots \\ r_N \end{bmatrix} \quad (5)$$

and stack the $|d_n|^{2T}$ in function (4) into a matrix:

$$E = \begin{bmatrix} |d_1|^{2T} \\ \vdots \\ |d_N|^{2T} \end{bmatrix}. \quad (6)$$

Note that with these definitions and from function (4), we have r=Ep.
3) Solve for the vector of source powers via $p=E^{-1}r$.
4) Solve for the source SNRs using SNRs=$p_s/\sigma^2$, for s=1, ..., S.

The estimated SNRs, as well as signal powers and noise power estimates, may then be communicated on line 250 to the cognitive engine 300 (as shown in FIGS. 4 and 6, line 250 in FIG. 9 is coupled to cognitive engine 300).

The low quality parameter estimator 241 aggregates information from the gradient calculator 249 and the dynamic range functions on lines 261 from the beam dynamic range calculator 247 for transmission to the cognitive engine 300 on line 260. The low quality parameter estimator 241 might also generate one or more of bandwidths, modulation type, carrier offset, phase offset, or others based, for example, on what the cognitive engine 300 needs.

The function of the cognitive engine 300 in FIGS. 4 and 6, when in the single beam mode, is to optimize the choice of the beam to enable successful demodulation by the MUD. More specifically, the cognitive engine 300 evaluates the environmental beam-dependent measures and makes a choice as to which beam to use to render the current operating point successful with the existing front end and MUD algorithm implemented within the receiver.

In some implementations, a constraint may be added that prevents the higher power user's received power from going below what would be needed to receive this user's rate. In other words, the beam grading unit 320 in FIG. 5 would incorporate into its grade the power that is required to achieve the current rate. There are several nuances in this, for example, the grade will be a function of the actual rate plus some rate buffer that is typically expected to be the difference between the rate an actual system can achieve and the theoretic capacity value. Other appropriate corrections could occur in the grading process as would be known to those skilled in the art of wireless communication and information theory.

The choice of the beam could be a function of which MUD is available in the receiver, and a rate-tool, such as the one described in a co-pending U.S. patent application entitled "Method and Apparatus for Rate Determination in a Radio Frequency System" by McLeod, et al., which is commonly owned with the present application, can be used to determine what the bound on the higher user's power needs to be.

The case where the antennas 100, 110 do not have known beam patterns can also be handled by the embodiment of FIG. 6. This situation can arise when, for example, (1) direction-of-arrival estimates cannot be generated for the sources, (2) there is severe, variable multipath due to nearby reflectors in the environment, (3) the antennas are on a vehicle and are subject to changing calibration because of door/hatches being in an opened or closed configuration, or (4) antenna flexing. In this case, neither of the functions (2) or (3) can be generated by the beam dynamic range calculator 247 and provided to the cognitive engine 300. For successful A/D conversion in A/D converter 700 in this case, it is assumed that operation is taking place in a tracking loop, and it is also assumed that the setting of the RF linear combiners 201, 210 and AGC 600 are such that no saturation is occurring in A/D converter 700, and that a reasonable operating point (comprised of the implemented multiuser detector and achievable rates triplet) is currently obtained by the cognitive engine 300. The channel and the source locations and transmitted powers are assumed to change slowly, relative to the tracking loop update dynamics.

Instead of functions (2) or (3), the low quality parameter estimator 241 may utilize gradient information provided by a gradient calculator 249 to calculate updates to the RF linear combiner configuration. The gradient calculator 249 estimates a gradient matrix between each RF linear combiner weight and the signals' dynamic ranges at the AGC output, the low quality parameter estimator 241 then uses these gradient estimates to step in a "downhill" direction to a more favorable dynamic range.

The assumption then is that this algorithm is operated in a tracking loop, where it is assumed that the setting of the RF weights and AGC are such that no saturation is occurring and that a reasonable multiuser capacity region is currently obtained, relative to the rates of the two interfering signals (e.g. the rate pair operating point is within the portion of the multiuser capacity region that corresponds to the MUD detector that has been implemented within the receiver.) The channel and the source locations and transmitted powers are assumed to change slowly, relative to the tracking loop update dynamics.

For the embodiment of FIG. 6, the current weights may be represented by a vector w. The parameter estimator that is required for the MUD algorithm estimates the SNRs of all signals present, so it is also capable of estimating the dynamic range D at the output of the AGC 600. One possible approach to providing a "cold" estimate of the received amplitudes at this point in the processing chain is to rely upon training sequences within the transmitted signals. Once a "lock" has been obtained on the signals and the MUD algorithms are engaged in detection/decoding of the signals, the signal parameters may be continuously tracked and updated for the MUD algorithm to continue to work properly. An additional metric and control feedback may be added to this "in-MUD" parameter update processing that monitors the dynamic range between the interfering signals and sends new weights to the beam combiner controller/ selector to properly adjust the dynamic range when it approaches the danger level as determined by the AGC+A/D effects. The Weight Control Algorithm then calculates small, random changes Δw to the weights. The new weights w+Δw are applied, and the new dynamic range D' measured. The next setting of the weights is:

$$w' = w - \mu \frac{D' - D}{\Delta w} \quad (7)$$

where 0<μ<1 is used to account for the channel dynamics. A smaller μ will lead to slower but more stable adaptation. However, μ cannot be too small as the algorithm may then fail to track channel dynamics.

Referring back to FIG. 5, the cognitive engine 300 will now be described in greater detail for a specific embodiment. The operating point which is output by operating point determination unit 310 along line 315 is defined by the rates of all the signals "seen" by the receiver as well as the MUD algorithm that has been implemented within the receiver. The nomenclature used throughout this description to represent the operating point is:

$$O = (R_a, R_A, MUD_b), \quad (8)$$

where $MUD_b$ is the specific MUD algorithm implemented in node b's receiver, and $R_a$ and $R_A$ are the rates of the information contained within the signals transmitted by nodes a and A, respectively. The rate of the information within the signal transmitted by node a is expressed in the number of information bits per channel use (or information bits per baud pulse or per modulated symbol) as follows:

$$R_a = \frac{k}{n} \log_2(M) \quad (9)$$

where M is the order of modulation and $\log_2(M)$ is the number of modulated bits per channel use, and $$\frac{k}{n}$$

is the coding rate (i.e., the number of information bits per modulated bits). For example, if the modulation scheme is 8-ary phase shift keying (8PSK), then M=8 and there are 3 bits embedded in every pulse transmitted. If an error correction code was applied between the source of information bits and the modulator, and if that error correction code were a $$\frac{k}{n} = \frac{1}{2}$$

rate code, then the rate of the information conveyed in the signal transmitted by node a would be $$R_a = \frac{1}{2} \times 3 = 1.5$$

information bits per channel use.

The rate of the signal transmitted by node A could be one of two definitions depending upon the configuration of the receiver within node b. If node b "knows" the code book used by transmitter A for the error correction coding of node A's signal and if node b employs a MUD that takes advantage of node A's error correction code, then, using the modulation and code rates employed in transmitter A, we would have:

$$R_A = \frac{k}{n} \log_2(M) \quad (10)$$

If, on the other hand, node b does not know or does not use the error correction embedded within transmitter A's signal, then we have:

$$R_A = \log_2(M) \quad (11)$$

The information that is conveyed to the cognitive engine 300 over line 980 would be the specific MUD algorithm that has been implemented within the subject receiver. Examples of various MUD algorithms that might be employed within the subject receiver are: (1) matched filter successive interference cancellation (MF SIC), (2) minimum mean squared error MUD (MMSE MUD), (3) MMSE SIC, (4) Turbo MUD, (5) M-Algorithm MUD, (6) other MUDs that attempt to mimic much of the optimum MUD processing, as well as many other possible MUDs.

To complete the definition of operating point which is output by unit 310 along line 315, we shall provide an example where we determine the operating point for the following case:
1. Node a
   (a) Modulation=8PSK (M=8, $\log_2(M)=3$)
   (b) Error Correction Code=⅞ rate convolutional code (k=7, n=8)
2. Node A
   (a) Modulation=QPSK (M=4, $\log_2(M)=2$)
   (b) Error Correction Code=¾ rate Reed Solomon code (k=3, n=4)
3. Node b
   (a) MUD type=MMSE SIC
   (b) Use a's error correction code within the MUD: YES ($R_a=3\times⅞=2=⅝=2.625$)
   (c) Use A's error correction code within the MUD: NO ($R_A=2$)

In the above case, the operating point is:

$$O = (2.625, 2, MMSE\ SIC). \quad (12)$$

The operating point determination unit 310 takes as input low quality signal parameter estimates over line 260 and the type of MUD algorithm that has been implemented in the receiver over line 980. An operating point can be determined with these two inputs. If higher quality signal parameters are available over line 970 and/or line 850, this unit may use the highest quality signal parameter values available to determine the operating point.

The low quality signal parameter estimates on input line 260 may include some or all of the following values. Those marked with an asterisk (*) are required for determination of the operating point. The other values may be used by the beam grading unit 320 to compute a grade for each beam. As will be described in greater detail, the up front parameter estimation unit 245 may provide these values.

Number of interfering signals*
Modulation (M) for each signal*
For each signal, whether or not the receiver will perform error correction decoding*
If the receiver will perform error correction decoding, the coding rate for that signal*
Baud timing offset of the interfering signals
Carrier frequency for each interfering signal
Cross correlation between every pair of interfering signals As described previously, the up front parameter estimation unit 245 may generate a list of SNRs for each beam on line 250. This list may then be input to the cognitive engine 300 (e.g., see FIG. 5). This list comprises one value of SNR for each interfering signal as it is received by each beam. For example, if there are two interfering signals and 10 possible beams, this list could be represented as a table with 10 rows, one for each beam, with two SNR's in each row. It is important that a single column in this table contains the SNRs corresponding to the same transmitter. Some beams would result in the SNR being the higher of the two signals, while other beams would result in this same signal being the lower of the two signals. It is important not to confuse the signals in this table.

Input Line 970 of cognitive engine 300 may include information typically produced within state of the art radio receivers that help the radio determine if it is meeting the necessary quality of service (QoS) by checking the packet drop rate for the signal of interest. If the packet drop rate is higher than some acceptable threshold, then the QoS is not met. In addition, typical to state of the art radio receivers is the possession of information that defines the waveform in use, to include assignments of values to the following: modulation scheme, error correction coding scheme, frequency band or center frequency and bandwidth, packet/frame structure, etc. This information may be known about one or all of the interfering signals and may, therefore, not need to be estimated by unit 245, but instead, unit 245 may simply need to determine the association of each waveform parameter list with the incoming environmentally determined values such as SNR, timing offset, frequency offset, etc.

Input Line 850 of cognitive engine 300 is a byproduct of the MUD processing since many MUD algorithms require very good estimates of each of the interfering signals' SNRs and/or receive amplitudes, baud timings, carrier offsets, modulation schemes, coding schemes, etc. The estimates made by MUD unit 900 in order to successfully perform the MUD may be of higher fidelity than is possible using only the analog signals available to the up front parameter estimation unit 245. MUD unit 900, however, will only have computed estimates for the selected beams.

Beam grading unit 320 of cognitive engine 300 (see FIG. 5) performs a test to determine if an operating point is feasible for each beam or combination of beams under consideration. If it is feasible, this unit then computes a grade that scores the level of "goodness" of this beam or combination of beams for the MUD processing that will be performed in the back end of the subject receiver.

The ordered beam list generation unit 330, for the single beam mode of operation, will generate a list that contains only one beam or beam combination. The beam number (for the case of the single-beam MUD) or set of numbers (for the case of multispatial MUD) output by unit 330 along line 360 indicates the beam or beam combination set that was scored the highest by unit 320.

The beam selector 365 of FIG. 4 takes information about the selected beam or set of beams from line 360, and performs the operation of multiplexing the output of the selected combiner (one of units 201-210) onto line 370. For each beam, this is a conventional operation (select one of a set of analog lines), which may be performed using, for example, isolation amplifiers, hybrid couplers, or analog switches.

The down converter 400 may include a conventional device that takes a down conversion tone 390 supplied by a conventional phase reference oscillator, and mixes it with the post-analog beamformed RF signal 370. The operation is used to convert a signal with an RF center frequency to a much lower baseband frequency, where ensuing digitization hardware typically functions.

The low pass filter 500 may include any type of filter that limits the frequency extent of signals passing through it. It is generally required so that ensuing digitization operations function properly in that aliasing of out of band signals do not occur.

The AGC unit 600 is a device that attempts to set the overall signal amplitude level that results from the combination of signals-of-interest, signals-not-of-interest, and noise. It accepts low-pass filtered information from filter 500 and acts to scale the amplitude of that signal to below the full scale input of the A/D converter 700, with some margin to avoid saturation or damage to the receiver components given this amount of gain. Additional consideration may be given to setting the gain so that the noise-like effect of quantization by the A/D converter 700 is generally low.

The A/D converter 700 is a conventional device that performs the actual digitization of the analog signal output by AGC unit 600. As has been previously noted, A/D converters sometimes have severe limitations in that the peak input signal level must be controlled rather tightly to avoid saturation and perhaps device damage. In addition, there may be a trade-off of cost versus dynamic range performance and capability inherent in choice of A/D converters. The ability for the cognitive engine 300 to intelligently and cognitively choose and/or reshape the total dynamic range of signals input to A/D converter 700 will allow a great cost reduction in that less capable A/D converters can be used.

The power and SNR estimator 248 can be performed more simply (without use of a tracking mode) in the multibeam mode, by making use of the multiple combiner/beams. It is more in line with conventional blind source separation type approaches, where multiple simultaneously gathered measurements are used.

The measurement model is:

$$Y = CAP^{1/2}S + N \qquad (13)$$

where:
- Y: N×K matrix of measured data
- N is the number of combiners and K is the number of samples
- K≥N≥M≥S
- M is the number of antennas and S is the number of sources (transmitters)
- C: N×M matrix of known linear combiner weights
- $C^+$: M×N pseudo inverse of the C matrix
- A: M×S matrix containing the unknown array response, but $|A_{ij}|^2=1$
- P: S×S, matrix of signal powers (diagonal matrix of unknown positive values)
- S: S×K, matrix containing the signals, one row corresponding to typically hundreds of symbols transmitted by each source or transmitter (unknown, but signal rows uncorrelated)
- $R_s(\tau)=E\{SS_\tau^H\}$ (temporal signal cross-correlation), where $S_\tau$ is the matrix S, shifting in time by τ samples. $R_s(\tau)$ is assumed to be diagonal, and $R_s(0)=I$, where I is the identity matrix (since matrix P defined above accounts for the signal powers)
- N: N×K matrix of colored white Gaussian noise with $E\{NN^H\}=\theta^2 I$, $\sigma^2$ unknown The effect of the antennas are modeled as merely phase shifts in a matrix A (treated as unknown phase shifts here for simplicity; other approaches using well known methods are possible if the array is calibrated). The signal powers are collected into a diagonal matrix P. It will be assumed that several RF linear combiners are available. In this situation, the signal and noise powers, and the SNRs may be calculated using the seven steps below. This approach is an adaptation of the second order blind identification (SOBI) algorithm.

1) Estimate $\sigma^2$ and S by minimum description length (MDL) or similar methods that determine subspace dimensionality. The noise power estimate $\sigma^2$ is output on line 250.
2) Calculate $Z=C^+Y$ and if M>S perform the additional "noise cleaning" operation as follows. Calculate the eigenvectors of $ZZ^H$ corresponding to the largest S eigenvalues, and collect these into an M×S matrix U. Then, calculate $Z_c=U^H Z$ and set Z equal to $Z_c$, Z is now of size S×S. Note that U and A span the same space so that $U^H A$ is full rank.
3) Form two temporal empirical covariance matrices:

$$R_z(\tau) = \frac{1}{K} Z Z_\tau^H \quad (14)$$

for $\tau=\tau_1$ and $\tau=\tau_2$ (and neither equal to zero). $Z_\tau$ is equal to Z shifted in time by τ samples. The τ's are to be chosen to be different from each other, and to approximately correspond to the reciprocal of the widest bandwidth of the signals of interest. Note that $\tau_1=0$ could be utilized if the excess estimated covariance error $\sigma^2 I$ is subtracted from the calculation of (14). Note from (13) that asymptotically $R_z(\tau)=U^H A P^{1/2} R_s(\tau) P^{1/2} A^H U$.

4) Calculate $G=R_z(\tau_1)(R_z(\tau_2))^{-1}$. Note that asymptotically:

$G=(U^H A) R_s(\tau_1) R_s^{-1}(\tau_2) (U^H A)^{-1}$

5) Calculate the eigenvectors of G, and collect them into a matrix V Techniques for performing this decomposition are well known. Note that V and $U^H A$ are related by multiplication of an arbitrary unknown diagonal phasor matrix D and an arbitrary unknown permutation matrix π, via $V=U^H A D \pi$. This ambiguity is well known in the SOBI method and has no negative impact on our method.
6) Calculate $W=V^{-1} Z$. Note that it can be shown that $WW^H=\pi^H P \pi$, so that W contains the signal power information we seek.
7) Calculate the estimated signal powers as follows. Let $w_i^H$ be the i th row of W. Then the estimated signal powers are calculated as $p_i=w_i^H w_i/K$, for i=1, . . . , S.
8) Calculate the SNRs via: $SNR_i=p_i/\sigma^2$, for i=1, . . . , S. These values are output on line 250.

The techniques, concepts, systems, and devices described herein may be used in a wide variety of different applications. For example, in one possible application, the techniques may be implemented within cellular systems that use femtocells to allow the femtocells to coexist on channels used by corresponding macrocells. In another application, the techniques may be implemented in wireless networks to permit, for example, an increase in the density of wireless access points in a network. In still another application, the techniques may be used to allow a terrestrial cellular system to operate within the same frequency band as, for example, a satellite communication system. Features of the invention may be implemented within a wide variety of node types including, for example, handheld wireless communicators, cell phones, smart phones, computers, wireless network interface devices, base stations, wireless access points, femto cell units, wireless gateway units, WiFi hotspot units, integrated circuits, and others. Many other applications also exist.

Having described preferred embodiments of the invention it will now become apparent to those of ordinary skill in the art that other embodiments incorporating these concepts may be used. Accordingly, it is submitted that the invention should not be limited to the described embodiments but rather should be limited only by the spirit and scope of the appended claims.

The invention claimed is:

1. A communication device for use in a multi-signal wireless environment having a signal of interest and one or more other signals in a common frequency band, the device comprising:
    at least one beamformer configured to form a plurality of receive beams, each receive beam in the plurality of receive beams configured to receive a composite signal having a different combination of the signal of interest and the one or more other signals, wherein the at least one beamformer includes a linear combiner, having configurable combining weights, that is capable of achieving a variety of different receive beams when the combining weights are varied;
    a multi-user detector (MUD) configured to demodulate the signal of interest within each composite signal;
    a cognitive engine configured to select one or more receive beams in the plurality of receive beams that will result in a received power difference between the signal of interest and the one or more other signals that are delivered to the MUD, wherein the one or more receive beams are selected to optimize demodulation of the signal of interest in the MUD such that the MUD is able to process the signal of interest to produce a bit stream having a level of errors correctable by an error correction decoder in a receiver coupled to the MUD; and a weight generation unit to generate weights for the linear combiner under control of the cognitive engine to achieve different receive beams.

2. The communication device of claim 1, wherein the at least one beamformer comprises an analog beamformer or a digital beamformer.

3. The communication device of claim 1, wherein the at least one beamformer includes multiple combiners that are each configured to linearly combine received signals, at least two of the multiple combiners linearly combining received signals differently.

4. The communication device of claim 3, further comprising a beam selector switch coupled to outputs of the multiple combiners to select, under control of the cognitive engine, one or more of the beams generated by the multiple combiners for further receiver processing.

5. The communication device of claim 1, further comprising a receive chain having an automatic gain controller or an analog to digital converter.

6. The communication device of claim 1 comprising one or more of: an integrated circuit, a handheld wireless communicator, a base station, a wireless access point, a femtocell unit for use in a cellular communication system, or a gateway unit for use in WiFi hotspots.

7. The communication device of claim 1, wherein the at least one beamformer is capable to perform beamforming that is only coarse.

* * * * *